United States Patent
Ye et al.

(10) Patent No.: US 9,097,533 B2
(45) Date of Patent: Aug. 4, 2015

(54) METHOD OF GENERATING GEOMETRIC HEADING AND POSITIONING SYSTEM USING THE SAME METHOD

(71) Applicant: Cywee Group Limited, Road Town, Tortola (VG)

(72) Inventors: Zhou Ye, Foster City, CA (US); Shun-Nan Liou, Kaohsiung (TW); Chin-Lung Lee, Taoyuan County (TW)

(73) Assignee: Cywee Group Limited, Road Town Tortola (VG)

(*) Notice: Subject to any disclaimer, the term of this patent is extended or adjusted under 35 U.S.C. 154(b) by 0 days.

(21) Appl. No.: 13/739,089

(22) Filed: Jan. 11, 2013

(65) Prior Publication Data
US 2013/0184991 A1 Jul. 18, 2013

Related U.S. Application Data

(60) Provisional application No. 61/586,109, filed on Jan. 12, 2012.

(51) Int. Cl.
*G01C 21/08* (2006.01)
*G01C 17/38* (2006.01)

(52) U.S. Cl.
CPC .............. *G01C 21/08* (2013.01); *G01C 17/38* (2013.01)

(58) Field of Classification Search
CPC ........ G01C 17/28; G01C 17/30; G01C 17/38; G01C 21/08; G01C 21/20; G01C 21/26; G01C 21/28; G01R 33/028; G05D 1/0206
USPC .......................... 701/504, 507, 522–525, 530
See application file for complete search history.

(56) References Cited

U.S. PATENT DOCUMENTS

| | | | |
|---|---|---|---|
| 5,345,382 A * | 9/1994 | Kao | 702/104 |
| 8,626,465 B2 * | 1/2014 | Moore et al. | 702/99 |
| 8,965,688 B2 * | 2/2015 | Bandyopadhyay et al. | 701/434 |
| 2004/0104720 A1 * | 6/2004 | Ramirez | 324/207.25 |
| 2005/0192747 A1 * | 9/2005 | Schiller et al. | 701/220 |
| 2005/0229411 A1 * | 10/2005 | Gnepf et al. | 33/356 |
| 2006/0241883 A1 * | 10/2006 | Kwon et al. | 702/92 |
| 2007/0032951 A1 * | 2/2007 | Tanenhaus et al. | 701/220 |
| 2007/0190494 A1 * | 8/2007 | Rosenberg | 434/11 |
| 2008/0252527 A1 * | 10/2008 | Garcia | 342/450 |
| 2009/0089001 A1 * | 4/2009 | Lin | 702/92 |
| 2009/0326851 A1 * | 12/2009 | Tanenhaus | 702/96 |
| 2010/0088063 A1 * | 4/2010 | Laughlin | 702/151 |
| 2010/0307016 A1 * | 12/2010 | Mayor et al. | 33/356 |
| 2010/0312519 A1 * | 12/2010 | Huang et al. | 702/150 |
| 2011/0307213 A1 * | 12/2011 | Zhao et al. | 702/153 |

FOREIGN PATENT DOCUMENTS

WO  WO 2005106391 A1 * 11/2005

* cited by examiner

Primary Examiner — Mary Cheung
Assistant Examiner — Atul Trivedi
(74) *Attorney, Agent, or Firm* — Alan D. Kamrath; Kamrath IP Lawfirm, P.A.

(57) ABSTRACT

A method of generating a geometric heading during positioning is provided. The method includes the following steps: estimating a current declination information of a current position according to a declination database, wherein the declination database gathers a magnetic map and a plurality of declination information corresponding to a difference between a magnetic north and a geometric north at all grid positions on the magnetic map; generating a predicted heading according to an angular velocity reading of a gyroscope and a magnetic heading reading of a magnetometer; and generating the geometric heading according to the current declination information of the current position and the predicted heading.

8 Claims, 9 Drawing Sheets

METHOD OF GENERATING GEOMETRIC HEADING AND POSITIONING SYSTEM USING THE SAME METHOD

CROSS-REFERENCE TO RELATED APPLICATION

This application claims priority of U.S. Provisional Application No. 61/586,109, filed on Jan. 12, 2012.

FIELD OF THE INVENTION

The present invention relates to heading, and more particularly, to a method of generating geometric heading and a positioning system using the same method.

BACKGROUND OF THE INVENTION

Please refer to FIG. 1. FIG. 1 is a diagram shows a magnetic map of the magnetic north. As shown in FIG. 1, the magnetic north varies with the position. The declination refers to the difference between the magnetic north and the geometric north. For example, the declination at the position 101 is sixty degrees; the declination of the position 102 is forty-five degrees; the declination of the position 103 is thirty degrees; and the declination of the position 104 is ten degrees.

The magnetic north may be provided by a magnetometer. However, what a user asks or requires is the geometric north, not the magnetic north. It is noted that the magnetic heading is the heading relative to the magnetic north, while the geometric heading is the heading relative to the geometric north. Hence, how to generate the geometric heading or how to calibrate the geometric heading according to the magnetic north in order to solve the above-mentioned problem has become an important topic in this field.

SUMMARY OF THE INVENTION

It is therefore one of the objectives of the present invention to provide a method of generating geometric heading and a positioning system using the same method to solve the above-mentioned problems in the prior art.

According to one aspect of the present invention, a method of generating geometric heading is provided. The method includes the following steps: estimating a current declination information of a current position according to a declination database, wherein the declination database gathers a magnetic map and a plurality of declination information corresponding to a difference between a magnetic north and a geometric north at all grid positions on the magnetic map; generating a predicted heading according to an angular velocity reading of a gyroscope and a magnetic heading reading of a magnetometer; and generating the geometric heading according to the current declination information of the current position and the predicted heading.

According to another aspect of the present invention, a positioning system for generating a geometric heading is provided. The positioning system includes a gyroscope, a magnetometer, and a processor. The gyroscope is arranged for providing an angular velocity reading. The magnetometer is arranged for providing a magnetic heading reading. The processor is arranged for executing the following steps: estimating a current declination information of a current position according to a declination database, wherein the declination database gathers a magnetic map and a plurality of declination information corresponding to a difference between a magnetic north and a geometric north at all positions on the magnetic map; generating a predicted heading according to the angular velocity reading of the gyroscope and the magnetic heading reading of the magnetometer; and generating the geometric heading according to the current declination information of the current position and the predicted heading.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
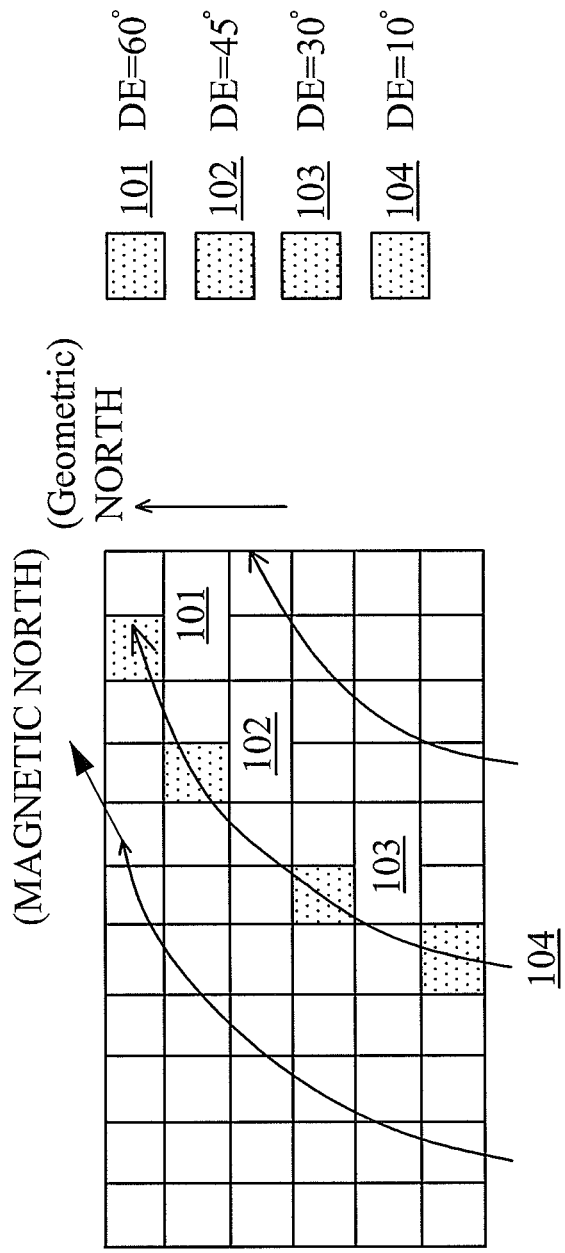
FIG. 1 is a diagram shows a magnetic map of the magnetic north.
Figure 2:
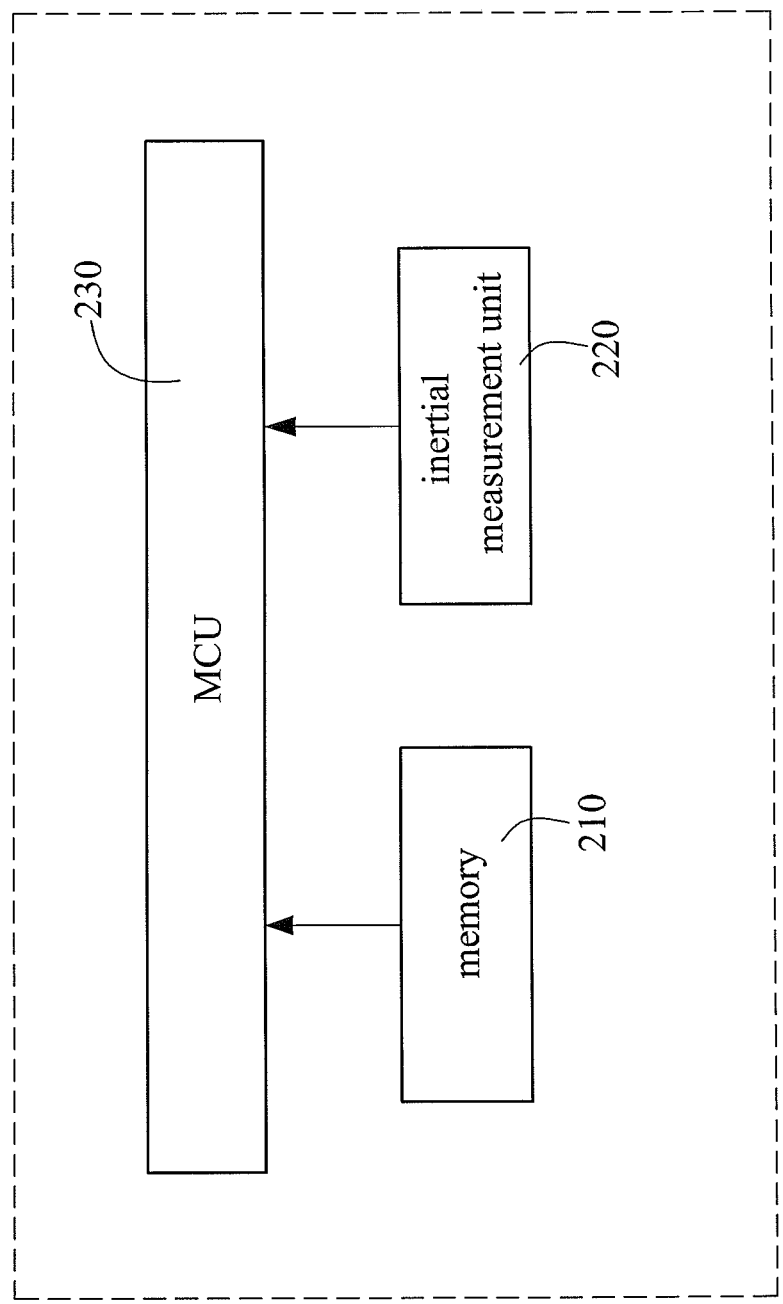
FIG. 2 is a block diagram of a positioning system for generating a geometric heading according to an embodiment of the present invention.

Please refer to FIG. 2. FIG. 2 is a block diagram of a positioning system 200 for generating a geometric heading according to an embodiment of the present invention. As shown in FIG. 2, the positioning system 200 may include, but is not limited to, a memory 210, an inertial measurement unit 220, and a processor 230. In one embodiment, the inertial measurement unit 220 may include a gyroscope 221 for providing an angular velocity reading and a magnetometer 222 for providing a magnetic heading reading. In another embodiment, the inertial measurement unit 220 may further include a pedometer or a G-sensor for generating acceleration information or the combination thereof, which also belongs to the scope of the present invention. The memory 210 is arranged for storing a declination database DB, wherein the declination database DB gathers a magnetic map and a plurality of declination information corresponding to a difference between a magnetic north and a geometric north at all positions on the magnetic map. The processor 230 is arranged for executing the following steps: estimating a current declination information of a current position according to the declination database; generating a predicted heading according to the angular velocity reading of the gyroscope and the magnetic heading reading of the magnetometer; and generating the geometric heading according to the current declination information of the current position and the predicted heading. Those skilled in the art can readily understand that the processor 230 also can generate the predicted heading according to the angular velocity reading of the gyroscope, the magnetic heading reading of the magnetometer and the an acceleration reading of the G-sensor, and further description is omitted here for brevity.

Please note that, the abovementioned declination database DB can be stored either on a server or on an electronic device (such as, a mobile phone, a tablet PC, or a notebook PC). Those skilled in the art will easily appreciate the operations of the positioning system 200 after reading the abovementioned description, and further description is omitted here for brevity.

Figure 3:
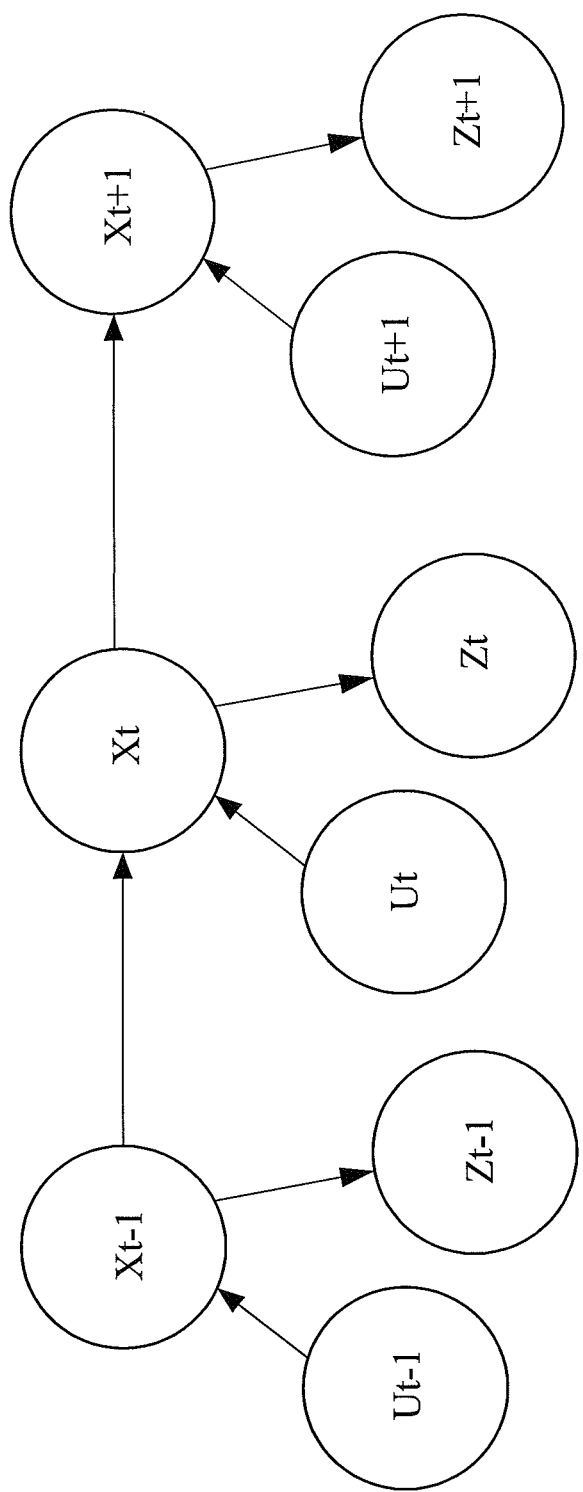
FIG. 3 is a block diagram illustrating a dynamic Bayesian network (DBN) according to an embodiment of the present invention.

Please refer to FIG. 3. FIG. 3 is a block diagram illustrating a dynamic Bayesian network (DBN) according to an embodiment of the present invention. The dynamic Bayesian network describes the relationships between the control, the states, the measurements, and the time frames. Each of the $X_t$, $u_t$, and $Z_t$ represents a characteristic at the time frame "t". Similarly, each of the $X_{t-1}$, $u_{t-1}$, and $Z_{t-1}$ represents a characteristic at the time frame "t-1"; while each of the $X_{t+1}$, $u_{t+1}$, and $Z_{t+1}$ represents a characteristic at the time frame "t+1". As can be seen from FIG. 3, $X_t$ can be estimated from $X_{t-1}$ and $u_t$; and $Z_t$ is measured and is used to update $X_t$.

Figure 4:
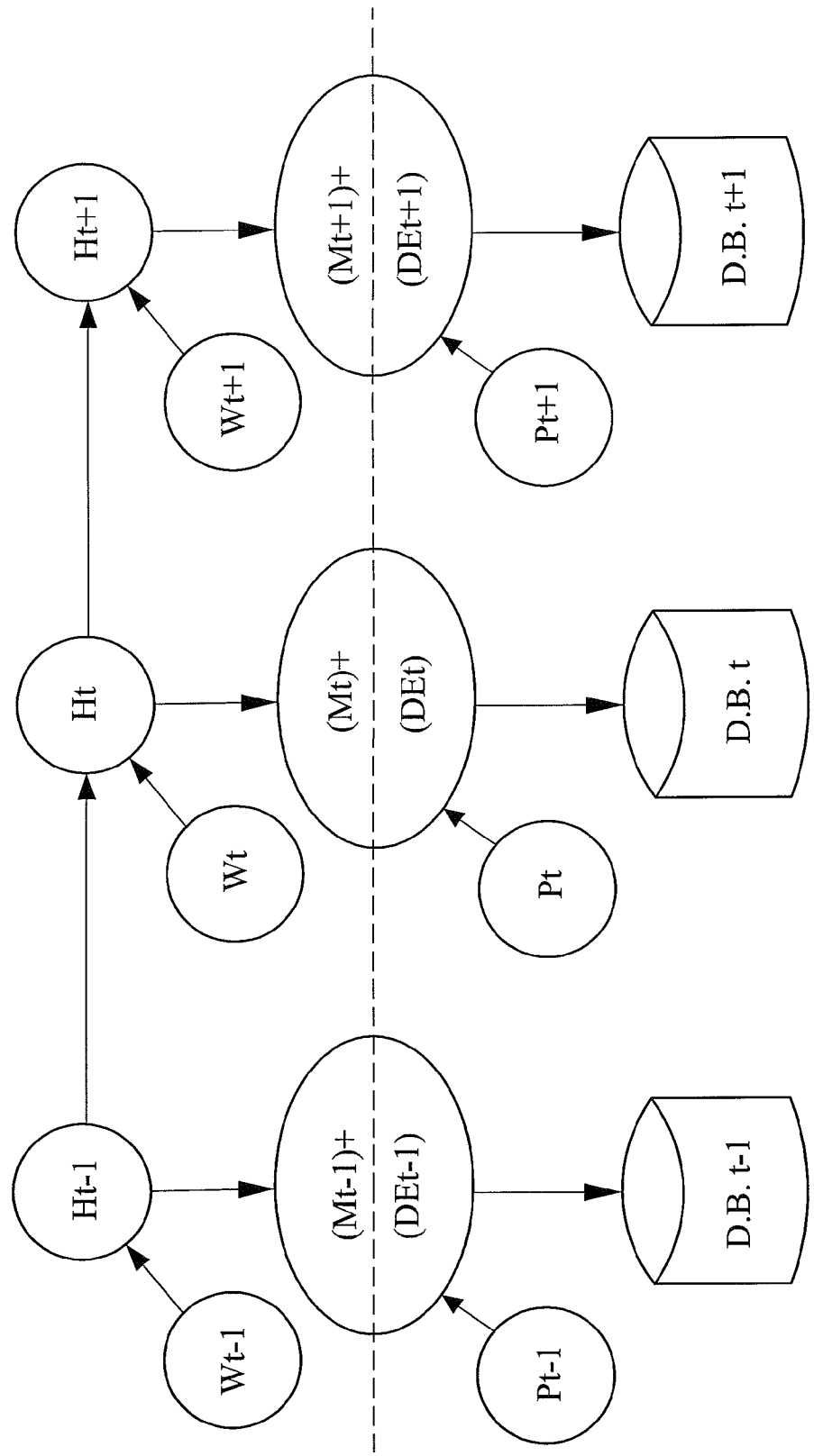
FIG. 4 is a block diagram illustrating how to generate a geometric heading according to a first embodiment of the present invention.

Please refer to FIG. 4. FIG. 4 is a block diagram illustrating how to generate a geometric heading according to a first embodiment of the present invention. In this embodiment, $H_{t-1}$, $H_t$, and $H_{t+1}$ represent the geometric heading at the time frame "t-1", the time frame "t", and the time frame "t+1", respectively. $W_{t-1}$, $W_t$, and $W_{t+1}$ represent the angular velocity measured by a gyroscope at the time frame "t-1", the time frame "t", and the time frame "t+1", respectively. $M_{t-1}$, $M_t$, and $M_{t+1}$ represent the magnetic heading at the time frame "t-1", the time frame "t", and the time frame "t+1", respectively. $DE_{t-1}$, $DE_t$, and $DE_{t+1}$ represent the declination information of the position at the time frame "t-1", the time frame "t", and the time frame "t+1", respectively. $P_{t-1}$, $P_t$, and $P_{t+1}$ represent the position or the displacement measured by the pedometer at the time frame "t-1", the time frame "t", and the time frame "t+1", respectively. $DB_{t-1}$, $DB_t$, and $DB_{t+1}$ represent the declination database at the time frame "t-1", the time frame "t", and the time frame "t+1", respectively. It's noted that the pedometer may include a G-sensor. The declination database DB gathers a magnetic map and a plurality of declination information corresponding to a difference between the magnetic north and the geometric north at all grid positions on the magnetic map.

In one embodiment, the method of generating a geometric heading shown in FIG. 4 may include the following steps: step of estimating a current declination information $DE_t$ of a current position $P_t$ according to a declination database $DB_t$ and the current position $P_t$; step of generating a predicted heading according to the angular velocity $W_t$ measured by the gyroscope and a previous geometric heading $H_{t-1}$; and updating the predicted heading using the magnetic heading $M_t$ from the magnetometer and the current declination information $DE_t$ of the current position $P_t$ so as to generate the geometric heading $H_t$.

Please refer to FIG. 4 together with FIG. 2. In another embodiment, the processor 230 may estimate the current declination information $DE_t$ of the current position $P_t$ according to the declination database $DB_t$ and the current position $P_t$. The processor 230 may generate the magnetic heading $M_t$ according to the magnetometer. In addition, the processor 230 further generate the current geometric heading $H_t$ according to the angular velocity $W_t$ measured by the gyroscope and the previous geometric heading $H_{t-1}$. After that, the processor 230 updates the current geometric heading $H_t$ according to the magnetic heading $M_t$ and the declination information $DE_t$ of the current position $P_t$.

Please refer to FIG. 4 together with FIG. 2. In still another embodiment, the processor 230 may estimate the current declination information $DE_t$ of the current position $P_t$ according to the declination database $DB_t$ and the current position $P_t$. The processor 230 may generate the magnetic heading $M_t$ according to the magnetometer. After that, the processor 230 updates the current geometric heading $H_t$ according to the magnetic heading $M_t$ and the current declination information $DE_t$ of the current position $P_t$.

Please refer to FIG. 4 together with FIG. 2. In still yet another embodiment, the processor 230 may estimate the current declination information $DE_t$ of the current position $P_t$ according to the declination database $DB_t$ and the current position $P_t$, and may update the heading using the current declination $DE_t$ of the current position $P_t$.

Figure 5:
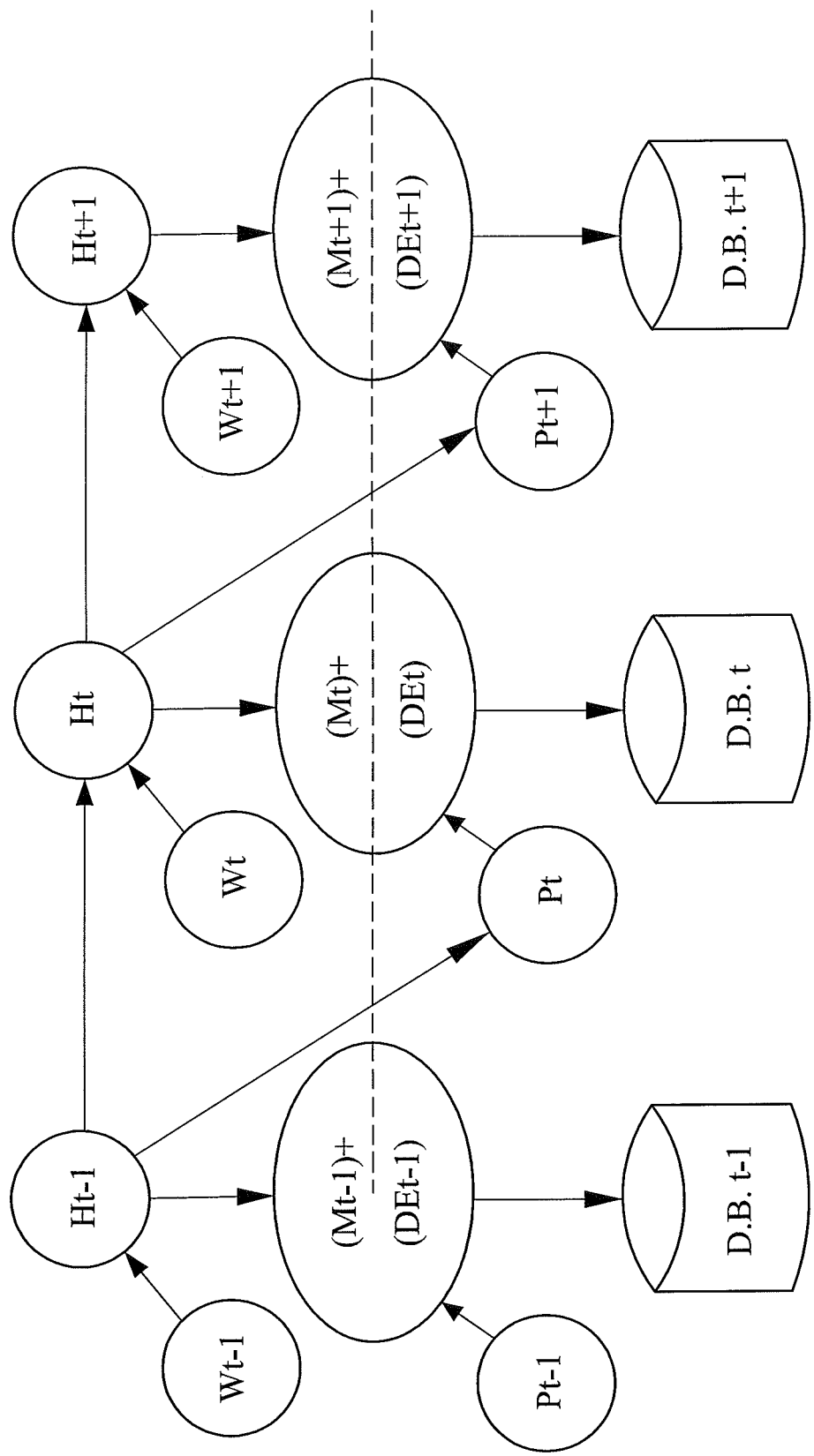
FIG. 5 is a block diagram illustrating how to generate a geometric heading according to a second embodiment of the present invention.

Please refer to FIG. 5. FIG. 5 is a block diagram illustrating how to generate a geometric heading according to a second embodiment of the present invention. The embodiment shown in FIG. 5 is similar to that shown in FIG. 4, and the major difference between them is that: the embodiment shown in FIG. 5 further shows the position $P_t$ at the time frame "t" is updated by the previous geometric heading $H_{t-1}$ at the time frame "t-1"; similarly, the position $P_{t+1}$ at the time frame "t+1" is updated by the geometric heading $H_t$ at the time frame "t".

Figure 6:
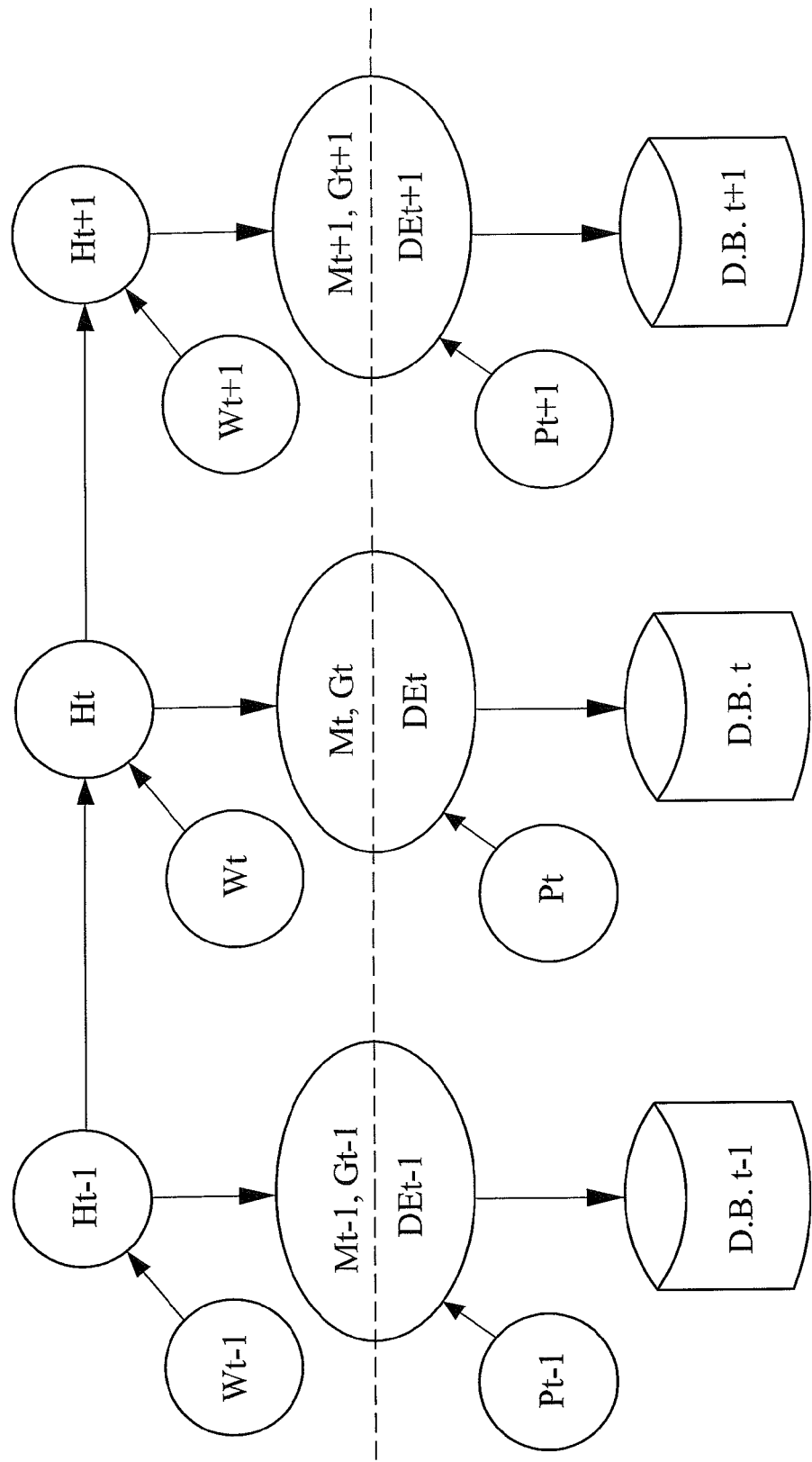
FIG. 6 is a block diagram illustrating how to generate a geometric heading according to a third embodiment of the present invention.

Please refer to FIG. 6. FIG. 6 is a block diagram illustrating how to generate a geometric heading according to a third embodiment of the present invention. The embodiment shown in FIG. 6 is similar to that shown in FIG. 4. In FIG. 6, $G_{t-1}$, $G_t$, and $G_{t+1}$ represent the gravity at the time frame "t-1", the time frame "t", and the time frame "t+1", respectively. Be noted the major difference between the embodiments shown in FIG. 6 and FIG. 4 is that: the gravity $G_t$ is considered. That is to say, the embodiment shown in FIG. 6 further shows the step of updating the predicted heading using the gravity $G_t$ measured from a G-sensor (not shown), the magnetic heading $M_t$ measured from the magnetometer, and the current declination information $DE_t$ of the current position $P_t$ so as to generate the geometric heading $H_t$.

The abovementioned embodiments are presented merely for describing the present invention, but this is not a limitation of the present invention. Those skilled in the art should readily know that various modifications of the functions of the processor 230 may be made without departing from the spirit of the present invention, which also belongs to the scope of the present invention. For example, the embodiments shown in FIG. 4-FIG. 6 can be arranged or combined randomly into a new varied embodiment.

Figure 7:
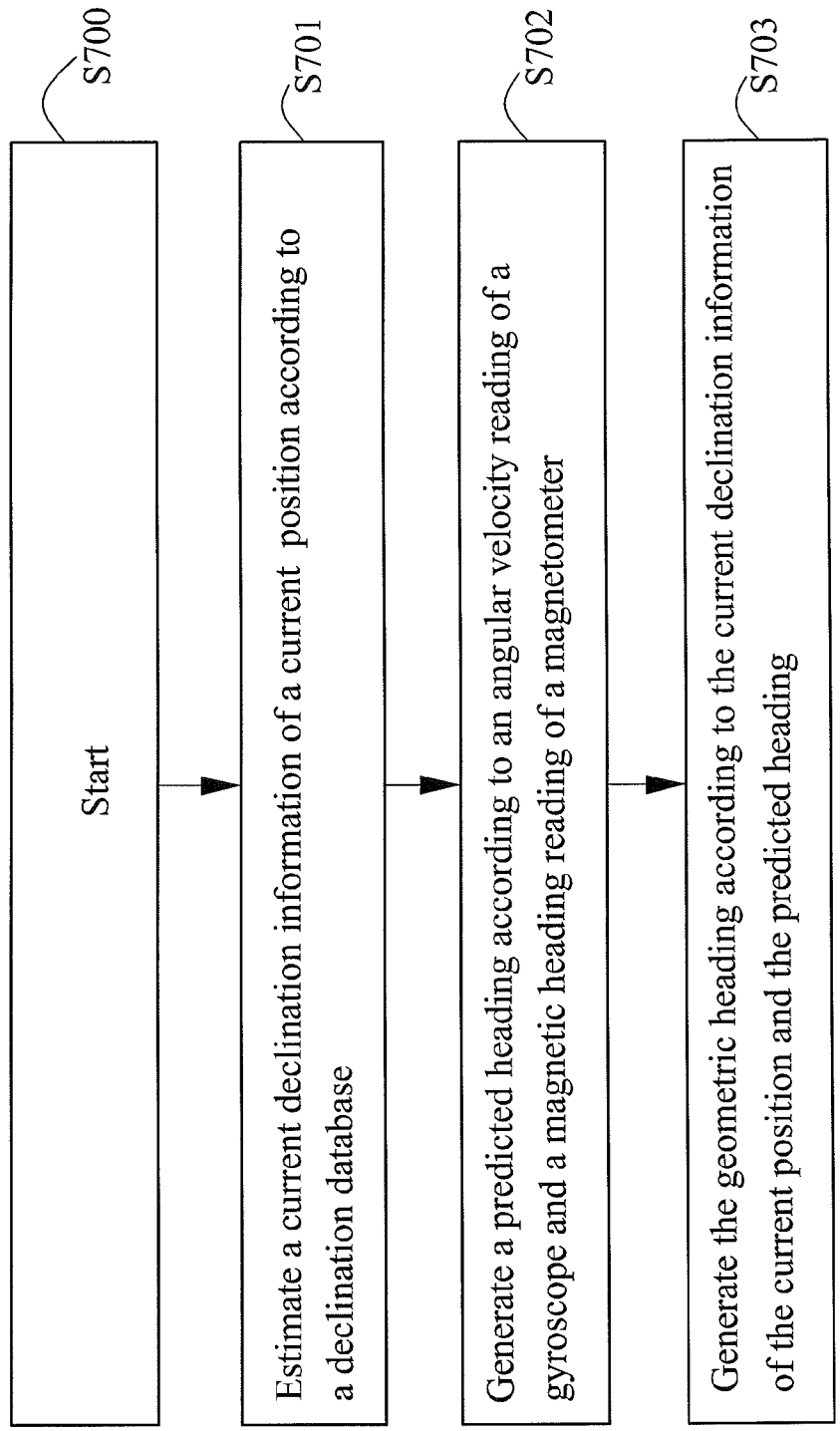
FIG. 7 is a flowchart illustrating a method of generating a geometric heading according to an exemplary embodiment of the present invention.

Please refer to FIG. 7. FIG. 7 is a flowchart illustrating a method of generating a geometric heading according to an exemplary embodiment of the present invention. Please note that the following steps are not limited to be performed according to the exact sequence shown in FIG. 7 if a roughly identical result can be obtained. The method includes, but is not limited to, the following steps:

Step S700: Start.

Step S701: Estimate a current declination information of a current position according to a declination database, wherein the declination database gathers a magnetic map and a plurality of declination information corresponding to a difference between a magnetic north and a geometric north at all grid positions on the magnetic map.

Step S702: Generate a predicted heading according to an angular velocity reading of a gyroscope and a magnetic heading reading of a magnetometer.

Step S703: Generate the geometric heading according to the current declination information of the current position and the predicted heading.

Those skilled in the art can readily understand how each element operates by combining the steps shown in FIG. 7 and the elements shown in FIG. 2, and further description is omitted here for brevity. In one embodiment, the step S701, S702, and S703 are executed by the processor 230. Be noted that the declination database DB can be stored in the memory 210, and the angular velocity reading and the magnetic heading reading can be provided by the inertial measurement unit 220.

Figure 8:
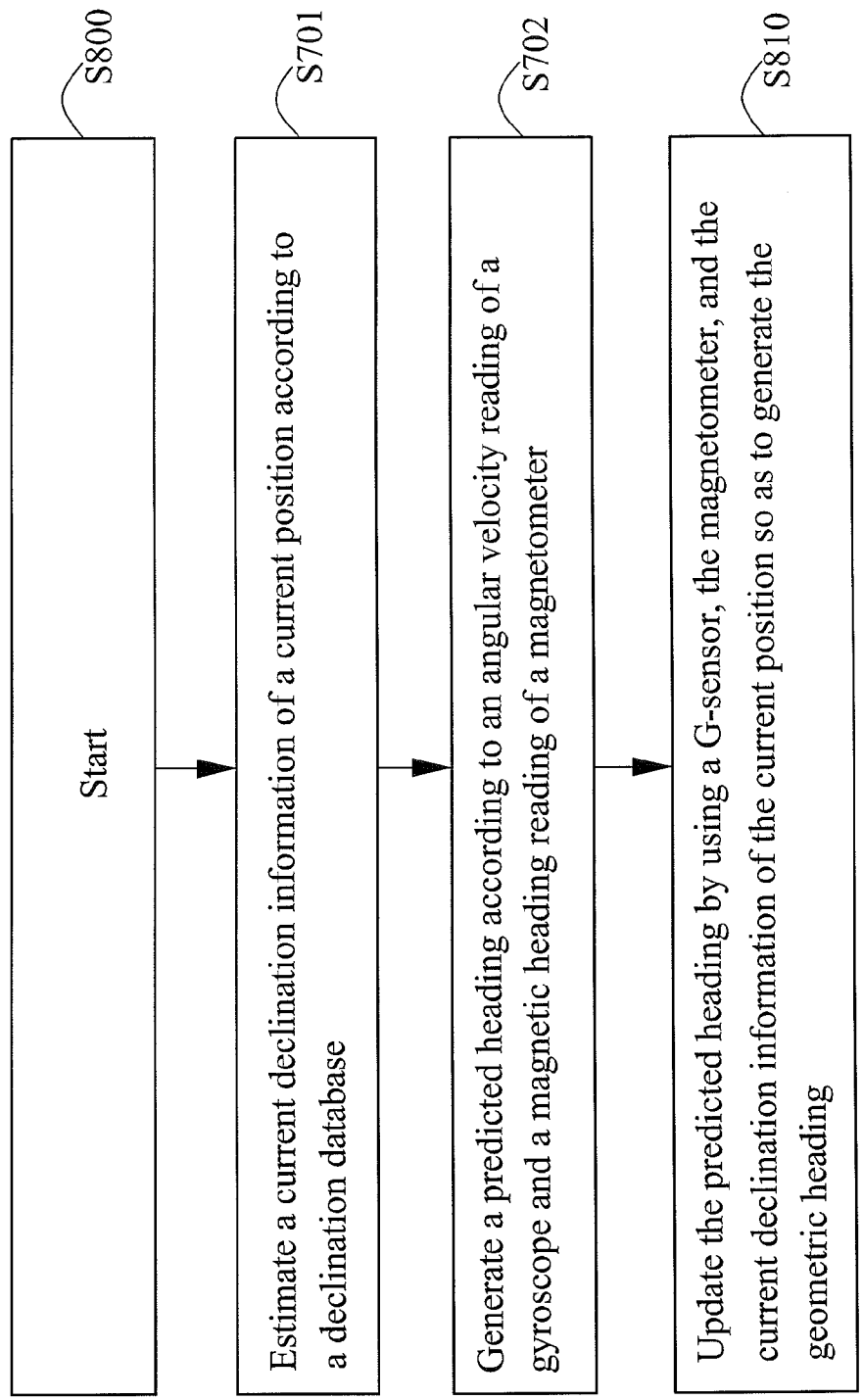
FIG. 8 is a flowchart illustrating a method of generating a geometric heading according to another exemplary embodiment of the present invention.

Please refer to FIG. 8. FIG. 8 is a flowchart illustrating a method of generating a geometric heading according to another exemplary embodiment of the present invention. Please note that the following steps are not limited to be performed according to the exact sequence shown in FIG. 8 if a roughly identical result can be obtained. The method includes, but is not limited to, the following steps:

Step S800: Start.

Step S701: Estimate a current declination information of a current position according to a declination database, wherein the declination database gathers a magnetic map and a plurality of declination information corresponding to a difference between a magnetic north and a geometric north at all grid positions on the magnetic map.

Step S702: Generate a predicted heading according to an angular velocity reading of a gyroscope and a magnetic heading reading of a magnetometer.

Step S810: Update the predicted heading by using a G-sensor, the magnetometer, and the current declination information of the current position so as to generate the geometric heading.

Those skilled in the art can readily understand how each element operates by combining the steps shown in FIG. 8 and the elements shown in FIG. 2, and further description is omitted here for brevity. The steps shown in FIG. 8 is similar to the steps shown in FIG. 7, and the difference between them is that FIG. 8 further includes the step S810, and the step S810 is executed by the processor 230. Be note that the G-sensor may be implemented by the inertial measurement unit 220.

Figure 9:
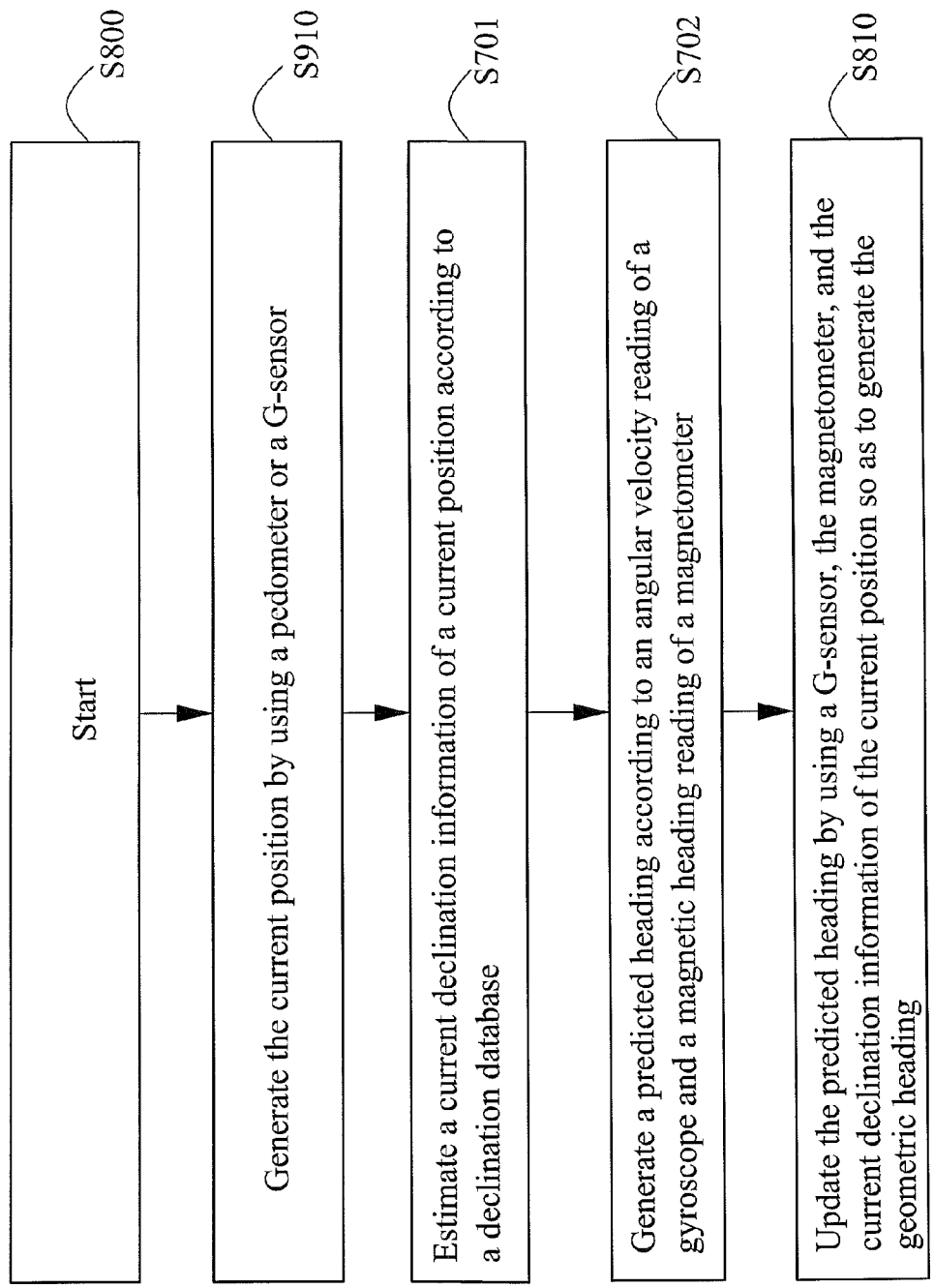
FIG. 9 is a flowchart illustrating a method of generating a geometric heading according to still another exemplary embodiment of the present invention.

Please refer to FIG. 9. FIG. 9 is a flowchart illustrating a method of generating a geometric heading according to still another exemplary embodiment of the present invention. Please note that the following steps are not limited to be performed according to the exact sequence shown in FIG. 9 if a roughly identical result can be obtained. The method includes, but is not limited to, the following steps:

Step S800: Start.

Step S910: Generate the current position by using a pedometer or a G-sensor.

Step S701: Estimate a current declination information of a current position according to a declination database, wherein the declination database gathers a magnetic map and a plurality of declination information corresponding to a difference between a magnetic north and a geometric north at all grid positions on the magnetic map.

Step S702: Generate a predicted heading according to an angular velocity reading of a gyroscope and a magnetic heading reading of a magnetometer.

Step S810: Update the predicted heading by using a G-sensor, the magnetometer, and the current declination information of the current position so as to generate the geometric heading.

Those skilled in the art can readily understand how each element operates by combining the steps shown in FIG. 9 and the elements shown in FIG. 2, and further description is omitted here for brevity. The steps shown in FIG. 9 is similar to the steps shown in FIG. 8, and the difference between them is that FIG. 9 further includes the step S910, and the step S910 may be implemented by the inertial measurement unit 220.

The abovementioned embodiments are presented merely to illustrate practicable designs of the present invention, and should be considered to be limitations of the scope of the present invention. In summary, by adopting the method of generating a geometric heading during positioning and the positioning system of the present invention, the geometric heading relative to the geometric north can be displayed to the user, which can make positioning more accurate.

Those skilled in the art will readily observe that numerous modifications and alterations of the device and method may be made while retaining the teachings of the invention.

What is claimed is:

1. A method of generating a geometric heading during positioning, comprising:
   estimating a current declination information of a current position according to a declination database, wherein the declination database gathers a magnetic map and a plurality of declination information corresponding to a difference between a magnetic north and a geometric north at all grid positions on the magnetic map;
   generating a current magnetic heading according to a magnetometer;
   generating a current geometric heading according to a current angular velocity reading of a gyroscope and a previous geometric heading, wherein the previous geometric heading is generated at a time frame (t−1) and the current geometric heading is generated at a time frame t; and
   updating the current geometric heading according to the current declination information of the current position and the current magnetic heading.

2. The method of claim 1, further comprising:
   updating the predicted heading by using a G-sensor, the magnetometer, and the current declination information of the current position so as to generate the geometric heading.

3. The method of claim 1, further comprises:
   generating the current position by using a previous heading and a pedometer or a G-sensor.

4. The method of claim 1, further comprises:
   storing the declination database in a memory.

5. A positioning system for generating a geometric heading, comprising:
   an inertial unit, at least comprises a gyroscope for providing a current angular velocity reading and a magnetometer for providing a current magnetic heading reading; and
   a processor, arranged for executing the following steps:
   estimating a current declination information of a current position according to a declination database, wherein the declination database gathers a magnetic map and a plurality of declination information corresponding to a difference between a magnetic north and a geometric north at all positions on the magnetic map; generating a current geometric heading according to the current angular velocity reading of the gyroscope and a previous geometric heading, and updating the current geometric heading according to the current declination information of the current position and the current magnetic heading; wherein the previous geometric heading is generated at a time frame (t−1) and the current geometric heading is generated at a time frame t.

6. The positioning system of claim 5, wherein the processor is further arranged for executing the following steps:
updating the predicted heading by using a G-sensor, the magnetometer, and the current declination information of the current position so as to generate the geometric heading.

7. The positioning system of claim 5, wherein the inertial measurement unit further comprises:
a pedometer or a G-sensor, arranged for generating the current position.

8. The positioning system of claim 5, further comprises:
a memory, arranged for storing the declination database.

* * * * *